Patented Oct. 12, 1937

2,095,822

UNITED STATES PATENT OFFICE 2,095,822

STABILIZING OF CELLULOSE ESTERS WITH HIGHER FATTY ACIDS

Carl J. Malm and Charles R. Fordyce, Rochester, N. Y., assignors, by mesne assignments, to Eastman Kodak Company, Jersey City, N. J., a corporation of New Jersey No Drawing. Application October 1, 1932, Serial No. 635,855

4 Claims. (Cl. 260—102)

The present invention relates to the stabilization of organic acid esters of cellulose against deterioration by treating the same with a higher fatty acid in which the ester is insoluble.

It is quite generally recognized that the instability and liability to deterioration of cellulose esters is due to the presence of combined sulfuric acid therein. It is well known that cellulose acetate as prepared commercially has been subject to decomposition and instability as recognized for instance in Worden's "Technology of Cellulose Esters" (1916) Volume VIII pages 2919–20 in which tests to determine the stability of the cellulose acetates are disclosed. It is disclosed therein that the "stability factor" of a carefully prepared cellulose acetate should not exceed 5. This "stability factor" is determined by ascertaining the amount of apparent acetic acid in grams liberated from 100 gms. of the ester when it is subjected to a temperature of 125° C. for three hours. A current difficulty in cellulose acetate manufacture has been the production of a cellulose acetate which will have sufficient stability for use in the finer arts, such as in the production of photographic film.

Other tests than those disclosed in Worden have also been evolved for determining the stability of cellulose esters for example the stability of an ester may be determined by applying a fairly severe heat (such as 180° C.) to the ester and observing the time necessary for charring to occur. Obviously the stability of the ester is directly proportional to the time over which the ester resists charring. If the ester is of a stable nature it will resist charring at 180° C. for several hours but in the case of an unstable cellulose ester containing an appreciable amount of combined sulfuric acid, the time in which charring will occur will be merely a matter of minutes.

A method has been proposed in which the combined sulfuric acid in cellulose acetate, for example, is replaced by acetyl, by dissolving the cellulose acetate in acetic acid and allowing it to stand for several hours in this solution. In the case of dope esterification to produce a cellulose ester this proposed treatment can be carried out before the ester is precipitated by adding sufficient quantities of water to change any acetic anhydride which might remain in the esterification mixture to the corresponding acid so that in the case of dope esterification processes that method might be satisfactory. However, if the cellulose ester has been produced according to a fibrous esterification process it becomes necessary in this proposed stabilization method to dissolve the fibrous cellulose ester and then reprecipitate it from the solution after the stabilization treatment. Processes are known in which the viscosity characteristics of cellulose esters are reduced by dissolving them in fatty acids. However, it is necessary in that case that the ester go into solution in the fatty acid.

One object of our invention is to provide a process of stabilizing cellulose esters in which the solution of the ester in the fatty acid employed is unnecessary and not desired. Another object of our invention is to provide a method of stabilizing a cellulose ester in suspension, this method being especially adapted to stabilizing cellulose esters produced by fibrous esterification processes. Other objects will hereinafter appear.

We have found that when a cellulose ester is treated according to the process of the present invention a product results which is extremely stable to the effects of heat and which has a negligible amount of deterioration or decomposition according to any of the stability tests referred to above. We have found that an organic ester of cellulose may be treated for a time in suspension with a higher homologue of acetic acid in which it is insoluble and the ester which previously may have exhibited poor and unsatisfactory stability will resist the application of a severe temperature for a comparatively long period of time. We have found that cellulose esters may be stabilized by means of a higher homologue of acetic acid without the necessity of dissolving the ester therein so that in the case of an ester produced by a fibrous esterification process the dissolving and precipitating thereof is unnecessary.

Our process can be applied only when the instability of the cellulose esters is due to the presence of combined sulfuric acid. Sulfuric acid is the catalyst most commonly employed in the esterification of cellulose and the product formed in such an esterification process will contain some of the cellulose sulfo-acetate which usually forms during that process. It is the presence of this sulfo-acetate in the product formed that detrimentally affects the stability of that product.

In the dope esterification of cellulose the ester formed is usually subjected to hydrolysis while still in the reaction mixture. In this hydrolysis step generally most of the sulfo-acetate is removed or rather converted into the normal acetate. Although our process may be employed to treat hydrolyzed cellulose esters, as a rule this type of ester is sufficiently stable for all practical purposes. With hydrolyzed esters therefor, our stabilizing process may be employed but such application is not essential.

In the fibrous esterification of cellulose, especially when the preparation of the mixed esters is contemplated, it is often desirable to eliminate the hydrolysis step entirely as the fully esterified product formed already has the desired solubilities and also a higher moisture resistance than the unhydrolyzed product. When this hydrolysis step is eliminated the removal of any of the combined sulfuric acid in the ester is unprovided for and the resulting product is unstable to heat.

Our invention may be performed by treating an organic ester of cellulose in undissolved form with a bath substantially comprising a higher homologue of acetic acid in which the ester is insoluble. The esters which may be stabilized by our invention may be either the simple fatty acid esters such as cellulose acetate, cellulose propionate or cellulose butyrate or the mixed fatty acid esters such as cellulose acetate propionate, cellulose acetate butyrate, cellulose acetate stearate, etc. The esters stabilized by our invention may be either those prepared by dope esterification processes or those in which the cellulose ester retains the fibrous form of the original material by the addition to the esterification bath of a non-solvent such as carbon tetrachloride, benzene or a higher aliphatic ether having a boiling point above 70° C. The use of the latter non-solvents has been disclosed and claimed in U. S. Patent No. 2,000,602 of C. J. Malm and C. L. Fletcher.

The following example illustrates a specific embodiment of our invention applied to the stabilization of a fibrous cellulose triacetate or unhydrolyzed cellulose acetate:

Ten parts of a fibrous cellulose triacetate containing about .1% of combined sulfuric acid was suspended in approximately 150 parts of butyric acid for about 48 hours. The material was then washed and dried and upon analysis was found to be substantially free of any combined sulfuric acid. It was also found to be very resistant to hydrolysis by boiling water.

The original fibrous cellulose triacetate was tested for stability by subjecting it to a temperature of 180–185° C. It was found that at that temperature the original material started to char in ten minutes. The stabilized ester resulting from the process of the above example was tested for stability by subjecting it to a temperature of 180–185° C. under the same conditions as before. This product withstood that temperature for 9 hours without showing any signs of decomposition or charring.

Other fatty acids both of the saturated or the unsaturated varieties such as propionic, valeric, crotonic, acrylic or even higher fatty acids may be employed in the present process providing the ester to be stabilized is insoluble in the acid employed. For instance, if it is desired to stabilize a cellulose acetate propionate, propionic acid would be unsuitable due to the solubility of the ester in that acid so that an acid similar to butyric acid or a higher fatty acid would necessarily be employed while on the other hand in the case of cellulose triacetate which is insoluble in propionic acid such treatment is perfectly satisfactory. Although the present process may be carried at ordinary temperatures, if desired, the temperature may be elevated to any practical degree, that is, so that neither the acid would boil off nor the ester would be decomposed.

Various other modifications might be made in the present process according to the skill and technique of the individual operator, and such modified processes are also to be understood as being within the scope of our invention.

We claim as our invention:

1. The process of stabilizing an organic acid ester of cellulose without hydrolysis of the ester which comprises treating it with a bath in which the ester is insoluble and which comprises a liquid higher homologue of acetic acid containing 3–5 carbon atoms.

2. The process of stabilizing a fibrous organic acid ester of cellulose without hydrolysis of the ester which comprises treating it with a bath in which the ester is insoluble and which comprises a liquid saturated higher homologue of acetic acid containing 3–5 carbon atoms.

3. The process of stabilizing a cellulose acetate without hydrolysis of that ester which comprises treating it with a bath in which the acetate is insoluble which comprises a liquid higher homologue of acetic acid containing 3–5 carbon atoms.

4. The process of stabilizing a cellulose acetate without hydrolysis of the ester which comprises treating it with a bath in which the acetate is insoluble which comprises butyric acid.

CARL J. MALM.
CHARLES R. FORDYCE.